June 11, 1968 M. J. E. GOLAY 3,387,494
TENSIONED MEMBRANE
Filed April 28, 1966
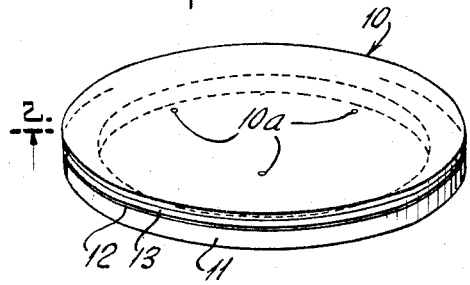
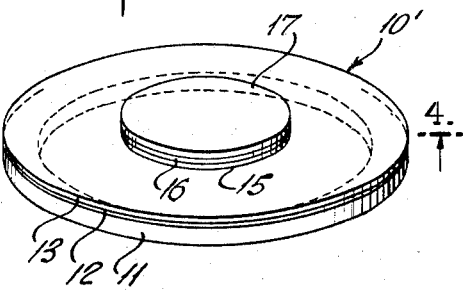
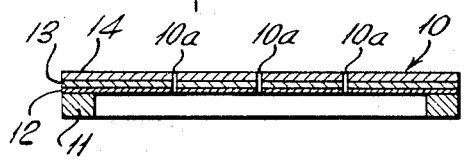
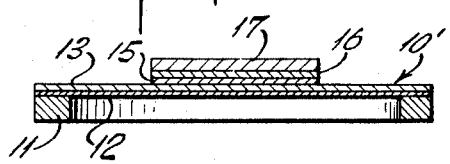
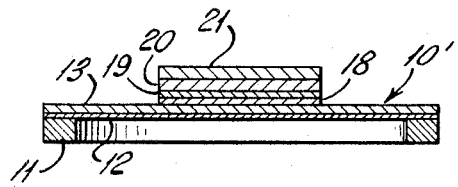
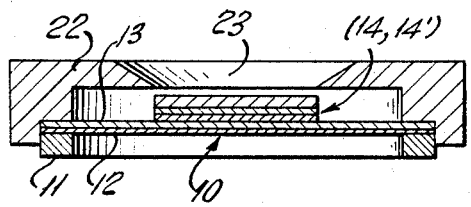
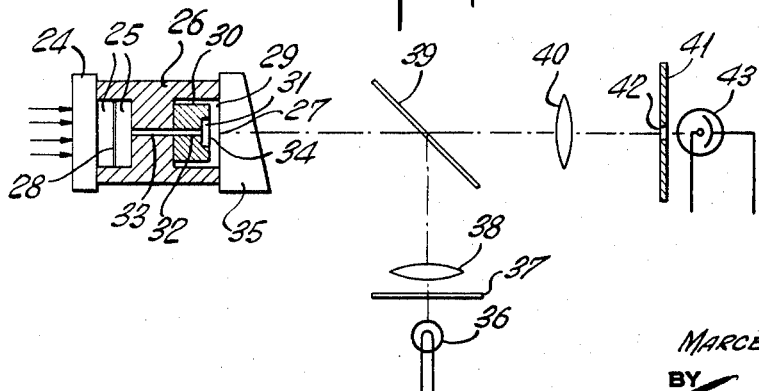
INVENTOR
MARCEL J. E. GOLAY
BY
ATTORNEY 3,387,494
TENSIONED MEMBRANE
Marcel J. E. Golay, 116 Ridge Road,
Rumson, N.J. 07760
Filed Apr. 28, 1966, Ser. No. 546,087
16 Claims. (Cl. 73—406)

This invention relates to thin membranes for the detection and measurement of differential pressures, and electrostatic fields, and for use in electron optical devices and other purposes and more specifically to improved membranes formed of a combination of materials and providing goods tension characteristics for extended periods of time.

Membranes for optical and electrical uses have heretofore been formed of a non-metallic substrate coated with a reflective material such as antimony. These membranes exhibit a natural tension in the undistended state when initially fabricated but this tension usually decreases with time and in many cases goes from positive to negative, i.e., the membrane tends to have a larger area than the area of the substrate originally covered by such a layer. The loss of the initial tension of the membranes results in creasing and wrinkling which destroys its optical properties or impairs its electrical properties.

While membranes in accordance with the invention may be made in a wide variety of sizes, they are generally of the order of one sixteenth to one eighth of an inch in diameter with thicknesses of the order of several hundred to several thousand angstroms depending upon the application.

This invention overcomes the foregoing difficulties heretofore encountered with thin membranes and provides an improved membrane that will remain free of wrinkles, retain a high degree of reflectivity, and maintain its natural tension for an indefinite period of time.

Another object of the invention resides in the novel and improved method for making membranes which will retain their natural tension for extended periods of time.

The above and other objects of the invention will become more apparent from the following description and drawings forming part of this application.

In the drawings:

FIGURE 1 is a greatly enlarged perspective view of a membrane mounted on a ring support in accordance with the invention.

FIGURE 2 is a cross sectional view of FIGURE 1.

FIGURE 3 is a greatly enlarged perspective view of a modified embodiment of the invention.

FIGURE 4 is a cross sectional view of FIGURE 3 taken along the line 4—4 thereof.

FIGURE 5 is a greatly enlarged cross sectional view of still another form of a membrane in accordance with the invention.

FIGURE 6 is a diagrammatic cross sectional view of a mask in position on a membrane during certain steps in the manufacture thereof.

FIGURE 7 is a diagrammatic view of one form of differential pressure measuring apparatus embodying a membrane in accordance with the invention.

While membranes in accordance with the invention may be used in a wide variety of applications for present purposes they will be described in connection with their use for the measurement of minute pressure differentials and displacements of the membrane produced by such differentials may be measured by any suitable optical means embodying a light source which is focused on the membrane and a light receiver which measures reflected light. Alternately these displacements may be measured electrically, e.g., by making the membrane one of the electrodes of a condenser, the changes in capacity of which are measured. When an optical system is utilized, it is arranged so that the intensity of light arriving at an optical detector will be modified in accordance with displacement of the membrane due to the existence of differing pressures on the two sides of the membrane. In these applications it is important that the tension of the membrane remain substantially constant for extended periods of time and present membranes consisting of a non-metallic substrate coated with a reflective material such as antimony tend to lose their tension with time with some membranes becoming useless in a matter of hours while other membranes may last for a year or more after fabrication. Replacement of these delicate membranes in optical apparatus is a tedious and expensive procedure, and known membranes have not been found sufficiently satisfactory and dependable.

The membrane in accordance with the invention has been found to retain its tension for virtually indefinite periods as it exhibits a remarkably low rate of tension change. Furthermore, the improved membrane lends itself to a variety of configurations for use with different types of optical or electrical detecting systems, and improved stability and reflectivity are attained without affecting the sensitivity of the membrane to differential pressure. Heretofore increased reflectivity was obtained by increasing the thickness of the metal deposited which produced an unreliable membrane.

One form of membrane in accordance with the invention is shown in FIGURES 1 and 2. The membrane, which is generally denoted by the numeral 10, is mounted on an annular ring 11 which supports the membrane during fabrication and is subsequently used to mount the membrane in associated apparatus for the detection and measurement of differential pressures. In the manufacture of the composite membrane 10, an exceedingly thin primary membrane or substrate 12 is formed of a non-metallic material such as collodion, formavar, celluloid or the like and this primary membrane preferably has a thickness of the order of one hundred to three hundred angstroms. The substrate 12 is then coated with a layer of arsenic 13 having a thickness of two hundred to five hundred angstroms. The arsenic is preferably evaporated onto the substrate 12 by heating the arsenic in a vacuum. The arsenic layer 13 and the substrate 12 produce a composite membrane having sufficient tension to provide excellent sensitivity to differential pressure and at the same time maintaining its tension for a virtually indefinite period. The maintenance of this tension prevents wrinkling of the membrane with the result that any reflective material deposited on the arsenic will maintain the desired optical qualities for the life of the membrane itself. The reflective layer 14 overlies the arsenic layer 13 and has a thickness of the order of four hundred to twelve hundred angstroms. While any suitable metal may be used for the layer 14, silver provides an excellent reflective layer that can be deposited by evaporation as in the case of the arsenic layer 13. Alternately, if the membrane is to be utilized as one of the electrodes of a condenser, any suitable metal with sufficient electrical conductivity may be utilized for the layer 14.

As pointed out above, the membrane in accordance with the invention is utilized for the measurement of differential pressures. In most applications the membrane is contained within a closed system and the pressures on each side thereof must be equalized prior to the sensing of a pressure change on one side thereof. While this has been accomplished in the past by the use of very fine equalization ducts, it has been found that most convenient equalization can be accomplished by perforating the membrane itself thus avoiding the time and expense of the formation of fine ducts. For this purpose a plurality of holes 10a may be provided in the membrane and formed by passing an electric arc therethrough. In this way holes of the order of .001 of an inch may be produced without affecting the operation of the membrane and the number of holes would be determined by the rate of pressure equalization desired.

In the form of the invention shown in FIGURES 3 and 4, the membrane 10' comprises the substrate 12 and arsenic layer 13 as in the previous embodiment of the invention. A second layer of arsenic 15 having a thickness of the order of two hundred to a thousand angstroms may be optionally applied to a portion of the area of the membrane, then a layer of silicon monoxide 16 having a thickness of the order of one hundred to four hundred angstroms may also be optionally applied, and then a layer 17 of silver having a thickness of four hundred to twelve hundred angstroms is applied. The silicon monoxide layer 16 is desirable in many applications to prevent any untoward solid state reactions by the two metals it serves to separate. It is evident of course that other suitable isolators may be used and the separating layer could, of course, be applied directly to the whole of the first arsenic layer 13 if desired. By reducing the diameters of the layers 15, 16, and 17, which form a relatively stiff structure, the original sensitivity of the membrane without said layers can be approached. It is also obvious that the layer of silicon monoxide, if not too thick, can be applied to the whole of arsenic layer 13, and then overlayed wholly by a silver layer.

A modified form of the invention is illustrated in FIGURE 5, and elements in this figure which correspond to elements of FIGURES 3 and 4, have been denoted by like numerals. In this embodiment of the invention a second layer 18 of arsenic having a diameter smaller than the membrane 10' is applied and then overlying layers 19, 20, and 21 of materials having high and low indices of refraction to form a dielectric mirror. For instance, the layer 19 may have a high index of refraction, the layer 20 a low index of refraction, and the layer 21 a high index of refraction. While it is sometimes inconvenient to use dielectric mirrors because of the thickness, yet if a small area of high reflectivity is adequate it can be carried by the membrane in accordance with the invention without adversely affecting its sensitivity and relatively long life.

In the formation of layers 15 to 17 of FIGURES 3 and 4 and the layers 18 to 21 of FIGURE 5, the membrane 10' having the layers 12 and 13 thereon is masked by an annular ring 22 having a central opening 23 therein as shown in FIGURE 6. This mask is spaced from the membrane and supported solely at the periphery and the spacing should be great enough so that the complete structure will not have a height greater than the distance between the mask and the membrane 10'.

One application of the membranes described above is illustrated diagrammatically in FIGURE 7. This device is intended for the measurement of radiation, passing through a radiation transparent window 24. The window 24 closes the chamber 25 on the left side of the housing 26 as viewed in the figure. In the center of chamber 25 there is a radiation absorbing membrane 28 which serves to heat the gas in chamber 25 when radiation entering chamber 25 impinges on said membrane 28. The right-hand portion of the housing 26 includes a chamber 29 containing an annular block 30 having a recess 31 in the surface thereof. The recess 31 is coupled to the chamber 25 by aligned passages 32 and 33 so that the gas in the chamber 25 also fills the conduits 32 and 33 and the chamber 31. The chamber 31 is closed by a membrane 34 fabricated in accordance with the invention, and having pressure equalizing holes extending therethrough to equalize the gas pressures in chambers 25 and 29. An optical wedge 35 closes the right-hand end of the housing 26. A light source 36 projects light through a filter 37 to produce essentially monochromatic light and this light is focused by means of lens 38, a half silvered mirror 39 and the wedge 35 onto the reflective portion of the membrane 34. The light reflected from the membrane 34 together with the light reflected by the inner surface 27 of wedge 35 will produce interference fringes. The two interfering light beams are passed by layer 39 and one of the interference fringes is focused by the lens 40 onto the edge of opening 42 in mask 41. Photocell 43 is positioned behind the opening, and with this arrangement, as the membrane 34 is displaced with changes in pressure the interference fringe will shift upwardly or downwardly as the case may be and modify the amount of light reaching the photocell 43.

Although the membrane in accordance with the invention has been illustrated and described in connection with a pneumatic detector for measuring radiation, it is obvious that it is equally applicable to other devices such as microphones, seismophones, and the like which rely on gas pressure changes for the operation thereof.

While only certain embodiments of the invention have been illustrated and dscribed, it is apparent that alterations, modifications and changes may be made without departing from the true scope and spirit thereof as defined by the appended claims.

What is claimed is:

1. A composite tensioned membrane for the detection of differential pressures comprising at least two layers of different materials firmly supported at their peripheries, one of said layers consisting of arsenic and the other layer having physical characteristics to enable the measurement of small distensions of said membrane produced by said differential pressures.

2. A membrane according to claim 1 wherein said one layer is arsenic and the other layer has reflective properties.

3. A membrane according to claim 1 wherein said other layer has electrical conductive properties.

4. A membrane according to claim 1 wherein said other layer is silver.

5. A membrane according to claim 1 wherein a separating layer is interposed between said layers.

6. A membrane according to claim 1 wherein said other layer comprises a laminate of dielectric layers of at least two different materials.

7. A membrane according to claim 1 wherein said other layer is formed of a reflective material and has a diameter less than the diameter of said one layer.

8. A membrane according to claim 1 including a third layer of transparent material, and wherein said other layer is formed of a reflecting material.

9. A membrane according to claim 8 wherein a fourth layer is interposed between the first said layers, said fourth layer being of a material differing from the materials of the first said layers.

10. A membrane according to claim 8 wherein a fourth layer is interposed between the first said layers, said fourth layer consisting of an isolating material.

11. A membrane according to claim 1 wherein a layer of silicon monoxide is interposed between said layers.

12. A composite tensioned membrane comprising a layer formed of a thin substrate and a layer of arsenic deposited on one side of said substrate.

13. A membrane according to claim 1 wherein said layers include at least one fine hole extending through the membrane.

14. A composite tensioned membrane comprising a supporting layer and first and second overlying layers of at least two different metals with at least one of said metallic layers being arsenic.

15. A composite tensioned membrane according to claim 13 wherein said thin substrate is formed of a cellulose compound.

16. A tensioned membrane for sensing pressure differentials comprising a support and a layer of arsenic carried by said support, said membrane further including means enabling the measurement of small distensions caused by said pressure differentials.

References Cited

UNITED STATES PATENTS 2,557,096   6/1951   Golay _____ 350—295 XR

LOUIS R. PRINCE, *Primary Examiner.*

D. O. WOODIEL, *Assistant Examiner.*